J. W. IVORY.
ARTIFICIAL TOOTH.
APPLICATION FILED MAY 12, 1909.
943,354.
Patented Dec. 14, 1909.
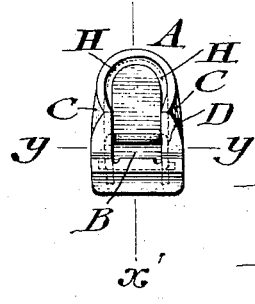
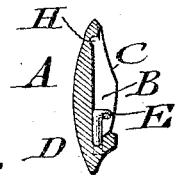
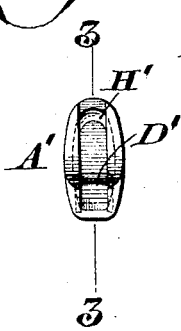
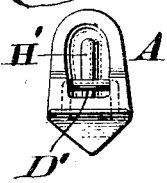
WITNESSES
P. F. Nagle.
L. Douville.
INVENTOR
James W. Ivory
BY
Wiedersheim & Fairbanks
ATTORNEYS

UNITED STATES PATENT OFFICE.

JAMES W. IVORY, OF PHILADELPHIA, PENNSYLVANIA.

ARTIFICIAL TOOTH.

943,354.  Specification of Letters Patent.  Patented Dec. 14, 1909.

Application filed May 12, 1909. Serial No. 495,534.

*To all whom it may concern:*

Be it known that I, JAMES W. IVORY, a subject of the King of Great Britain, residing in the city and county of Philadelphia, State of Pennsylvania, have invented a new and useful Artificial Tooth, of which the following is a specification.

My invention is designed as an improvement upon the known methods of securing teeth to a plate.

The novelty will be defined by the following description and the appended claim.

For the purpose of explaining the invention, the accompanying drawing illustrates a satisfactory reduction of the same to practice, but the important instrumentalities thereof may be varied, and so it is to be understood that the invention is not limited to the specific arrangement and organization shown and described.

Figure 1 represents a rear elevation of a tooth embodying my invention. Fig. 2 represents a section thereof, on line $x$—$x$. Fig. 3 represents a section thereof, on line $y$—$y$. Fig. 4 represents a perspective view of the staple member detached. Figs. 5 and 6 represent rear elevations of other forms of teeth embodying my invention. Fig. 7 represents a section on line $z$—$z$, Fig. 5. Fig. 8 represents a perspective view of another form of the staple-like member.

Similar letters of reference indicate corresponding parts in the figures.

Referring to the drawing:—A designates an artificial tooth, in the lingual or palatal face of which is the dove-tailed recess B having lateral walls with grooves, the same extending in a longitudinal lateral direction of the tooth, said grooves terminating in deeper recess in the body of the tooth and having its sides closed by walls or borders C, which become integral with the biting edge of the tooth, thus vastly strengthening the side portions of the tooth. The recess is open on the lingual or palatal face of the tooth and continued into the body of the tooth and adapted to receive therethrough the material of the dental plate or support, thus anchoring the tooth in said plate and firmly connecting it therewith.

D designates a staple-like member, whose cross bar E occupies a position between the lateral walls in the recess B, its sides or legs F being sprung into the recess and grooves of the tooth to occupy grooves in the lateral walls, which run parallel with the longitudinal axis of the tooth, being embedded in the material of the tooth and thus firmly connected therewith, it being seen that the member presents a loop or eye, which is adapted to have the adjacent material of the dental plate or support embedded around the same, thus providing means for anchoring the tooth on said plate or support and most firmly connecting it therewith. In order to provide additional means for securing the legs F in position, the terminals of the same are out-turned laterally, forming the lips G, which are embedded in the material of a tooth at an angle to the legs F, the effect of which is evident.

The face of the recess has a groove H therein, the same being adapted to additionally receive the adjacent material of the dental plate or support, thus strengthening the connection of the tooth with the plate.

In Figs. 5, 6 and 7, I show teeth $A'$, which are different forms than in Figs. 1 and 2, and a staple-like member $D'$ without lips on the legs F thereof, as in Fig. 4, but in other respects, the teeth in said Figs. 4, 6 and 7 possess the structural advantage, as in Figs. 1, 2, 3 and 4, the grooves $H'$ are also provided, the same as the groove H.

Having thus described my invention, what I claim as new and desire to secure by Letters Patent, is:—

An artificial tooth having in the lingual or palatal portion thereof a recess having lateral walls with grooves extending in the longitudinal direction of the tooth, said grooves terminating in a deeper recess in the body of the tooth, the end of said recess being closed by walls integral with the biting edge of the tooth, said recess being open on the lingual or palatal face of the tooth, and a staple-like member having its cross bar occupying a position between the lateral walls in said recess and its legs sprung into the recess and grooves of the tooth and occupying the grooves in the lateral walls, the terminals of said legs being outturned and embedded in the material of the tooth at an angle to said legs.

JAMES W. IVORY.

Witnesses:
JOHN A. WIEDERSHEIM,
HARRY C. DALTON.